United States Patent [19]
Lee et al.

[11] Patent Number: 6,167,522
[45] Date of Patent: *Dec. 26, 2000

[54] METHOD AND APPARATUS FOR PROVIDING SECURITY FOR SERVERS EXECUTING APPLICATION PROGRAMS RECEIVED VIA A NETWORK

[75] Inventors: Jong Y. Lee, Mountain View; Satish K. Dharmaraj, Santa Clara, both of Calif.

[73] Assignee: Sun Microsystems, Inc., Mountain View, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/829,990

[22] Filed: Apr. 1, 1997

[51] Int. Cl.⁷ .................................................. G06F 12/14
[52] U.S. Cl. .......................................... 713/201; 713/165
[58] Field of Search .............................. 395/187.01, 186; 380/4; 713/200, 201, 164, 165, 166, 180, 181; 705/51, 59

[56] References Cited

U.S. PATENT DOCUMENTS

| | | | |
|---|---|---|---|
| 5,421,006 | 5/1995 | Jablon et al. | 395/575 |
| 5,692,047 | 11/1997 | McManis | 380/4 |
| 5,720,033 | 2/1998 | Deo | 395/186 |
| 5,825,877 | 10/1998 | Dan et al. | 705/54 |
| 5,892,904 | 4/1999 | Atkinson et al. | 713/201 |
| 5,928,323 | 7/1999 | Gosling et al. | 709/203 |
| 5,958,051 | 9/1999 | Renaud et al. | 713/200 |

FOREIGN PATENT DOCUMENTS

| | | |
|---|---|---|
| 0 409 397 A2 | 6/1990 | European Pat. Off. . |
| 0 409 397 A3 | 6/1990 | European Pat. Off. . |
| 0 570 123 A1 | 4/1993 | European Pat. Off. . |
| 0 580 350 A1 | 7/1993 | European Pat. Off. . |

OTHER PUBLICATIONS

Glenn Krasner, "The Smalltalk–80 Virtual Machine", Learning Research Group, Byte Publication Inc., Aug. 1981, pp. 300–320.

*Primary Examiner*—Ly V. Hua
*Assistant Examiner*—Christopher Revak
*Attorney, Agent, or Firm*—Blakely, Sokoloff, Taylor & Zafman

[57] ABSTRACT

A method and apparatus for providing security to a server running an application program received over a network is provided. The application program, along with a source identifier is received from a source computer. Access privileges to server resources are granted based on the source identifier. The application program is loaded into a predetermined, bounded region of memory.

22 Claims, 3 Drawing Sheets

METHOD AND APPARATUS FOR PROVIDING SECURITY FOR SERVERS EXECUTING APPLICATION PROGRAMS RECEIVED VIA A NETWORK

FIELD OF THE INVENTION

The present invention relates to network computing, and more specifically, to providing security for servers that receive applications programs via a network.

BACKGROUND OF THE INVENTION

Currently, the largest computer network in existence is the Internet, which is a worldwide interconnection of computer networks that communicate using a common protocol. The Internet grew out of work funded in the 1960s by the United States Department of Defense's Advanced Research Projects Agency (ARPA). Millions of computers, from low end personal computers to high-end super computers are connected to the Internet. For many years, few outside of the academic/research community accessed the Internet.

In 1989, a new type of information system known as the World-Wide Web (the Web) was introduced to the Internet. Early development of the Web took place at CERN, the European Particle Physics Laboratory. The Web is a wide-area hypermedia information retrieval system.

At that time, architecture of the Web typically followed a conventional client-server model. The terms "client" and "server" are used to refer to a computer's general role as a requester of data (the client) or provider of data (the server). In the Web environment, Web browsers, such as Mosaic, reside in clients and Web documents reside in servers. Web clients and Web servers communicate using a protocol called "HyperText Transfer Protocol" (HTTP). A browser opens a connection to a server and initiates a request for a document. The server delivers the requested document, typically in the form of a text document coded in a standard HyperText Markup Language (HTML) format.

Programs written in the Java™ language, developed by Sun Microsystems of Mountain View, Calif., are architecture neutral such that the programs run on any platform that supports Java. The programs are architecture neutral because they are compiled into a series of byte-codes that are not hardware specific and thus can be downloaded and executed on many different computers. Byte-codes are transmitted over the Internet and then translated and executed by the receiving computer.

One unique feature of Java not provided by Web browsers that do not support Java is an ability to provide applets as part of a Web page. Applets are part of a Web page, but they are downloaded and executed by the computer running a Web browser rather than the Web server. Thus, a user, with a browser that supports Java, accesses a Web page and downloads a small program that is executed locally. This, however, presents security issues not present in the traditional client-server model.

To provide security, Java methods and variables are accessed by name and are executed in a restricted environment that includes a predetermined portion of memory. Furthermore, when byte-codes are received they are subjected to a verification process that determines whether the byte-codes have been modified.

Security for applets may be provided in a straightforward all-or-nothing manner. For example, the applet is loaded and executed, or it is not loaded and executed. Because the applet is self-contained, it does not access local resources other than a designated, bounded region of memory.

Another unique feature of Java is the servlet, which is a program, like an applet, however, a servlet runs on the Web server rather than the Web browser. Servlets are typically larger than applets and/or require more resources. For example, a servlet may be a search program offered by a particular server. A user accesses the servlet by supplying search parameters. The servlet then executes a search of resources available to the server. Thus, a user may have access to certain server resources and the server may have its search software updated by a third party without any effort by the server administrator.

Because servlets may require access to server resources, the all-or-nothing approach is inefficient. In order to provide a secure all-or-nothing scheme in a server that loads servlets, a standard subset of resources would be offered to all servlets. However, different servlets require different resources and different servlet sources may be worthy of different levels of trust. Thus, prior security schemes do not provide a flexible, yet secure, environment for providing servlets on a server. Therefore, it would be desirable to provide security to Web servers from potentially hostile programs, wherein permissions to access the resources of the server are granted based on the source of the program.

As the Web grows, it would be desirable to provide greater access to the resources and features of the Web. Thus, many controllers of Web servers may wish to provide access to servlets developed by third parties. Therefore, it would be desirable to provide security to Web servers from potentially hostile servlets, wherein access to the resources of the server are allocated based on the source of a particular servlet.

SUMMARY OF THE INVENTION

A method and apparatus for providing security for a server executing programs received by the server via a network is disclosed. An application program that is to be provided by a Web server along with a source identifier is received by the Web server via a network, such as the Internet. Before loading the application program, the server performs a verification procedure including granting access privileges based on the source identifier. Access privileges are granted or withheld for a plurality of resources available to the server. If an application program is received from a known hostile source or no access privileges are granted, the applications program may be rejected. Thus, the resources defining the application program's universe, or sandbox, is determined individually based on source identifiers.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus for providing security to servers running applications programs based on the source of the application program is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

An application program that is to be provided by a Web server along with a source identifier is received by the Web server via a network, such as, the Internet. The source identifier functions as an indication of sponsorship. The entity sponsoring, or vouching for, the reliability of the application program signs the application program. Thus, the level of trust afforded the signing entity is granted to applications programs signed by that entity.

Before loading the application program, the server performs a verification procedure including granting access privileges based on the source identifier. Access privileges are granted or withheld for resources available to the server. If an application program is received from a known hostile source, or if no access privileges are granted, the applications program may be rejected. Thus, the resources defining the application program's universe, or sandbox, are determined individually based on source identifiers.

Figure 1:
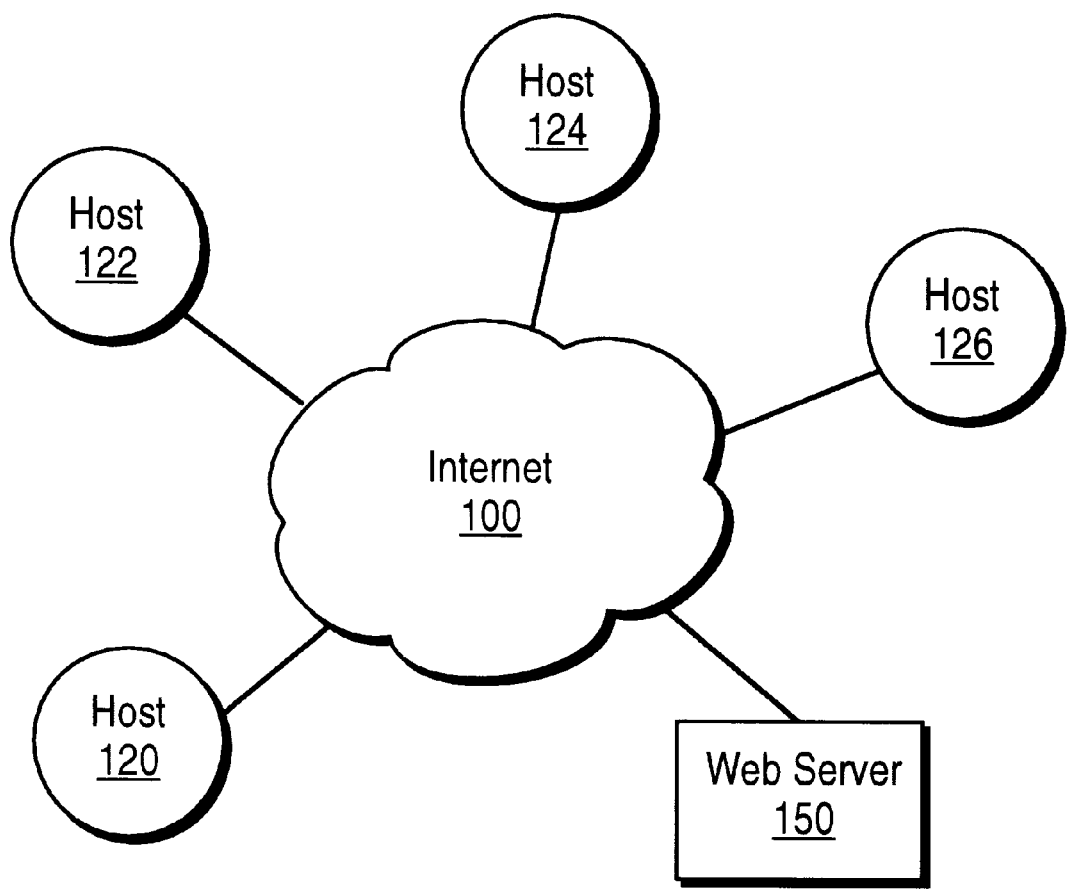
FIG. 1 is one embodiment of a network that may be used to practice the present invention.

FIG. 1 is one embodiment of a network that may be used to practice the present invention. Internet 100 connects a plurality of hosts, such as hosts 120, 122, 124 and 126 to Web server 150. The hosts may also act as Web servers to provide files or resources to other hosts. Alternatively, Internet 100 may be a local area network (LAN) or other network that connects a plurality of computers together.

According to the present invention, a host may send a program, such as a servlet, to Web server 150. When Web server 150 receives a servlet and a source identifier from a source computer, the source of the servlet is checked to determine the access privileges available to the servlet. It is important to note that source identifiers indicate the entity that sponsors or vouches for the reliability of the servlet, not the source computer from which the servlet is received. Thus, a servlet may be signed by a particular entity and distributed by many other computers that may or may not be associated with the signing entity. Web server 150 may reject a servlet from an unknown or known hostile source, or Web server 150 may accept and load a servlet and grant access to server resources based on the source identifier. Once the servlet is loaded by Web server 150, it may be accessed by a Web browser running on a host connected to Web server 150.

Figure 2:
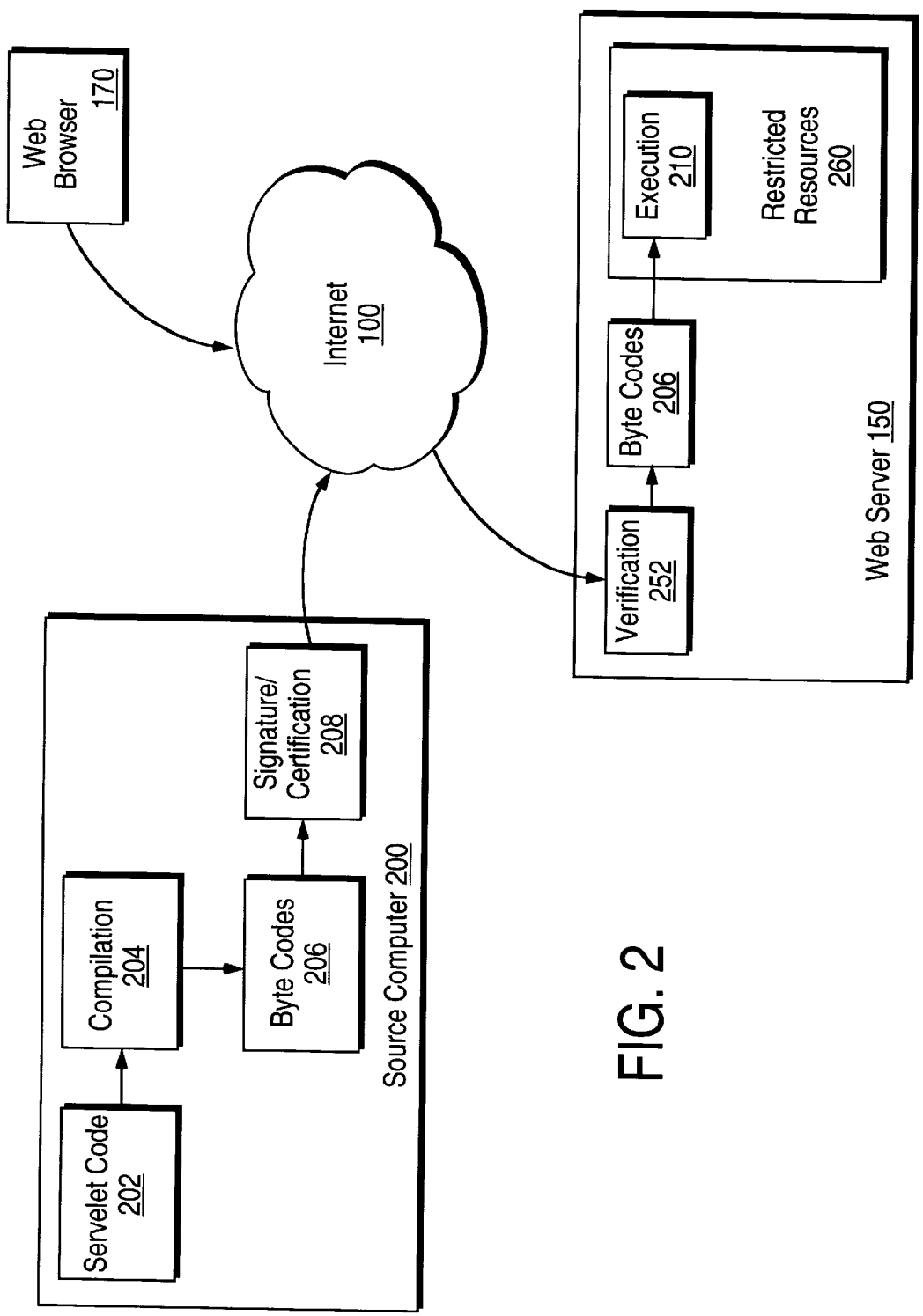
FIG. 2 is a block diagram for practicing the present invention.

FIG. 2 is one embodiment of a source computer coupled to a Web server via the Internet according to the present invention. The steps for providing security in the server according to one embodiment are shown as blocks in the computer that performs that step.

An application program, such as a servlet, may be developed on a computer other than the one on which it is to be offered over a network. A servlet is written in servlet code, shown by 202. According to one embodiment, the servlet is developed in a Java environment, however, a servlet or other program may be developed in a non-Java environment. The servlet code is compiled, at 204, into a plurality of byte codes, shown by 206. Byte-codes are similar to machine instructions, however, they are not machine specific. Byte-length codes are used in one embodiment of the present invention, however, other code sizes may also be used. It is important to note that all of the codes are the same size.

A digital signature, which may include a digital certificate, represented by 208, is then appended to byte-codes 206. This digital signature acts as a source identifier. According to one embodiment, the digital certificate is an X.509 certificate, as well known to those of ordinary skill in the art. However, other source identifiers may also be used. The source identifier must provide a secure and unique identification of the signer such that the administrator of the receiving web server may trust the source identifier to authenticate the source of the servlet. For simplicity, source computer 200 is also the signing entity, however, this is not necessarily always the case. A computer other than source computer 200 may be a sponsor and add a digital signature to the servlet.

The byte-codes are sent to a designated server via the Internet 100, or other network. The receiving computer, such as Web server 150 that receives the byte-codes executes a verification process 252. Verification comprises examining the source identifier, such as digital signature 208, to a local list of known trusted sources and granting resource privileges based on that source identifier. Additionally, the verification process includes other verification techniques to determine whether the byte-codes have been modified or if the source identifier has been modified. According to one embodiment, an access control list (ACL) is maintained on Web server 150 that stores trusted sources and the privileges extended to servlets received from those sources. Resource privileges include load privileges, permission to read or to write files on the server's disk(s), network read and write privileges, execution privileges, system property access, and socket listen or connect privileges. Other privileges may also be granted. Any combination of one or more of these access privileges may be granted to a servlet.

Once the byte-codes have been verified, they are translated into servlets configured to run on the architecture of Web server 150. The servlet is then loaded into the servlet's sandbox (i.e., a known, bounded area in memory and granted access only to those specific resources listed in the ACL). Once the servlet is loaded in Web server 150, Web browser 170 may access the servlet and any resources available to the servlet. Thus, resource privileges are granted on a servlet-by-servlet basis, which increases the flexibility of a Web server's security. This improved flexibility allows administrators to grant more privileges to known and trusted sources, while granting fewer privileges to new or unknown sources. By eliminating an all-or-nothing security approach, the web may offer more resources in a more convenient manner.

Figure 3:
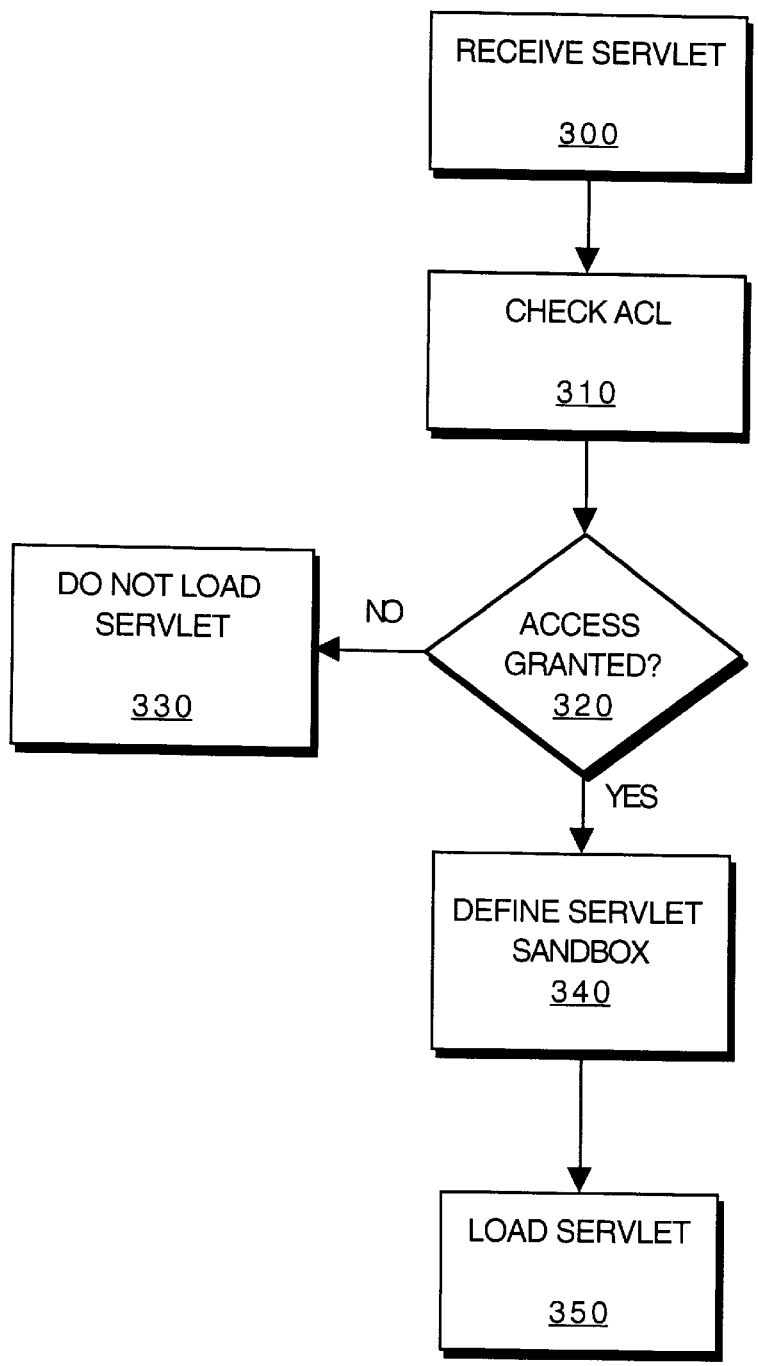
FIG. 3 is a flow diagram of one embodiment of verifying a servlet and allocating resources to the servlet based on the source of the servlet according to the present invention.

FIG. 3 is a flow diagram of one embodiment of verifying a servlet and allocating resources to the servlet based on the source of the servlet according to the present invention. In step 300, a Web server receives a servlet or other application program via a network, such as the Internet.

In step 310 the local ACL is checked to determine what, if any, privileges are to be granted to the servlet based on the source identifier received with the servlet. The ACL may contain an entry for unsigned servlets to grant a specified level of access to all unsigned servlets. Alternatively, the Web server may reject all unsigned servlets along with servlets received from a source known to be hostile.

If no access privileges are granted in step 320, the servlet is rejected or not loaded in step 330. If the servlet is granted access privileges in step 320, a sandbox is defined for the servlet in step 340. A sandbox defines the set of access privileges granted to the servlet.

In step 350, the servlet is loaded by Web server 150. In addition to limitations imposed on a servlet by the sandbox to which it is assigned, other checks may be performed. For example, accesses to certain resources may be monitored by the server to guard against hostile behavior.

Thus, by providing identity-based access controls, a Web server can control which servlets have access to which data. This arrangement provides protection against theft or alteration of data. In addition, by restricting a servlet to a sandbox, the Web server can control the damage that malicious code can cause.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method comprising:
   receiving a servlet from a source computer, wherein the servlet has an associated source identifier that uniquely identifies a sponsor of the servlet in a secure manner; and
   granting one or more access privileges to resources to be provided by a server to the servlet, wherein the access privileges are individually determined for each resource based, at least in part, on the source identifier.

2. The method of claim 1, wherein the source identifier is a digital signature.

3. The method of claim 1, wherein determining resources to be provided for use by the application program based on the source identifier comprises checking an access control list (ACL) to determine the resources available to the servlet based on the source identifier.

4. The method of claim 1, wherein the access privileges comprise one or more of:
   server disk read privileges;
   server disk write privileges;
   server network read privileges; and
   server network write privileges.

5. The method of claim 1, wherein the access privileges comprise one or more of:
   execution privileges;
   system property access privileges;
   socket connect privileges; and
   socket listen privileges.

6. The method of claim 1, wherein the source identifier identifies the source computer.

7. The method of claim 1, wherein the source identifier identifies a computer that is not the source computer.

8. A method for providing a servlet for execution on a remote server, wherein the server allocates local resource access based on a source of the servlet, the method comprising:
   generating the servlet;
   compiling the servlet into a plurality of predetermined length codes;
   generating a source identifier;
   associating the source identifier with the codes; and
   sending the codes and the source identifier to a server, wherein the server verifies the codes and allocates access privileges to local resources based on the source identifier, the access privileges are individually determined for each resource based, at least in part on the source identifier, her wherein the server generates the servlet based on the codes received.

9. The method of claim 8, wherein the source identifier comprises a digital signature.

10. The method of claim 8, wherein the plurality of predetermined length codes comprises a plurality of byte-length codes.

11. The method of claim 8, wherein the access privileges comprise one or more of:
    server disk read privileges;
    server disk write privileges;
    server network read privileges; and
    server network write privileges.

12. The method of claim 8, wherein the access privileges comprise one or more of:
    execution privileges;
    system property access privileges,
    socket connect privileges; and
    socket listen privileges.

13. The method of claim 8, wherein the source identifier identifies the source computer.

14. The method of claim 8, wherein the source identifier identifies a computer that is not the source computer.

15. An apparatus for loading a servlet received from a source computer for use on a server, the apparatus comprising:
    means for receiving the servlet from a source computer, wherein the servlet has associated with it a source identifier that uniquely identifies a sponsor of the servlet in a secure manner;
    granting one or more access privileges to resources to be provided by the server to the servlet, wherein the access privileges are individually determined for each resource based, at least in part, on the source identifier.

16. The apparatus of claim 15 wherein the source identifier comprises a digital signature.

17. The apparatus of claim 16, wherein the means for determining resources accessible by the server comprises an access control list (ACL) maintained on the server.

18. A machine readable medium having stored thereon data representing sequences of instructions, which when executed by a processor, cause the processor to:
    receive a servlet from a source computer, wherein the servlet has associated with it a source identifier that uniquely identifies a sponsor of the servlet in a secure manner;
    grant one or more access privileges to resources to be provided by the server to the servlet, wherein the access privileges are individually determined for each resource based, at least in part, on the source identifier.

19. The machine readable medium of claim 18, wherein the source identifier comprises a digital signature.

20. The machine readable medium of claim 18, wherein the sequence of instructions that cause the processor to determine resources accessible by the server to be provided for use by the servlet based on the source identifier further comprises sequences of instructions that cause the processor to check an access control list (ACL) to determine the resources available to the servlet based on the source identifier.

21. The machine readable medium of claim 18, wherein the access privileges comprise one or more of:
    server disk read privileges;
    server disk write privileges;
    server network read privileges; and
    server network write privileges.

22. The machine readable medium of claim 18, wherein the access privileges comprise one or more of:

execution privileges;

system property access privileges;

socket connect privileges; and socket listen privileges.

* * * * *